United States Patent [19]

Smoral et al.

[11] Patent Number: 5,608,448
[45] Date of Patent: Mar. 4, 1997

[54] HYBRID ARCHITECTURE FOR VIDEO ON DEMAND SERVER

[75] Inventors: Vincent J. Smoral, Endwell, N.Y.; Peter M. Kogge, Granger, Ind.; Phillip J. Sementilli, Jr., Tucson, Ariz.

[73] Assignee: Lockheed Martin Corporation, Bethesda, Md.

[21] Appl. No.: 419,474

[22] Filed: Apr. 10, 1995

[51] Int. Cl.$^6$ .............................. H04N 7/10; H04N 7/173
[52] U.S. Cl. .................................. 348/7; 348/12; 348/13
[58] Field of Search .................................. 348/7, 8, 10, 6, 348/13, 12, 714, 715; 455/4.1, 4.2, 5.1; 395/550, 425, 200; H04N 7/10, 7/16, 7/14, 7/173

[56] References Cited

U.S. PATENT DOCUMENTS

| 4,381,522 | 4/1983 | Lambert | 348/7 |
| 4,760,442 | 7/1988 | O'Connell et al. | 348/7 |
| 5,179,551 | 1/1993 | Turner | 370/60 |
| 5,389,963 | 2/1995 | Lepley et al. | 348/7 |

FOREIGN PATENT DOCUMENTS

| 0570729 | 4/1993 | European Pat. Off. . |
| 0570741 | 4/1993 | European Pat. Off. . |
| 0570950 | 5/1993 | European Pat. Off. . |
| 0570951 | 5/1993 | European Pat. Off. . |

OTHER PUBLICATIONS

"Classification Categories and Historical Development of Circuit Switch Topologies", pp. 95–133.
IEEE article—MultiMedia–Fall 1994 "What Is Multimedia, Anyway"? p. 3.
IEEE article—MultiMedia–Fall 1994 "In The News", p. 5.
IEEE article—MultiMedia–Fall 1994 "Prospects for Interactive Video–On–Demand", pp. 14–24.
IEEE article—MultiMedia–Fall 1994 "An Open Architecture for Digital Communication Systems", pp. 77–83.

*Primary Examiner*—Michael Lee
*Attorney, Agent, or Firm*—William H. Steinberg

[57] ABSTRACT

Processing requirement at each computing element in a video server for a video on demand (VOD) system are reduced to only those needed for VOD, resulting in a less expensive processor with less memory and, hence, lower cost. A hybrid video server architecture combines the best features of massive parallel processor (MPP) and workstation designs into a cost effective high performance system. Since it is not necessary to run a parallel relational database program in order to accomplish VOD data distribution, a unique type of switch element that is well matched to the VOD server problem is employed. By matching this switch element technology to an appropriate data storage technique, a full featured, responsive VOD server is realized that can be affordably installed at regional cable distribution centers nationwide.

10 Claims, 12 Drawing Sheets

EXT = I/O Port Off Chip (External)

INT = I/O Port to On Chip PEs (Internal)

* = CPU ISA includes single instruction 64B Transfers.

Dual 2x2 Crossbars
Per Chip

HYBRID ARCHITECTURE FOR VIDEO ON DEMAND SERVER

BACKGROUND OF THE INVENTION

The present invention generally relates to database servers and, more particularly, to a hybrid architecture for video on demand (VOD) server which combines the best features of massively parallel processing (MPP) and workstation designs into a cost effective high performance system.

One potential service to be provided by the emerging national information infrastructure (or the so-called "information superhighway") is video on demand (VOD). VOD (or near-video on demand (NVOD)) is a service in which a viewer selects from a large catalogue of available movies, and the selected movie is almost immediately ready to be displayed on the viewer's home television set. The viewer interactively controls the playing of the movie in the same manner supported by video cassette recorders (VCRs). Thus, the VOD service acts as a virtual VCR coupled to a virtual video rental store. A viewer can watch any movie at any time with a few keystrokes on a home terminal device. A survey of VOD systems is presented by Thomas D.C. Little and Dinesh Venkatesh in "Prospects for Interactive Video-on-Demand", *IEEE Multimedia*, Fall 1994, pp. 14–24.

FIG. 1 shows a functional block diagram of a VOD system. At the heart of the system is the video server 10 which routes the digital movies, resident in the movie storage system 11, to the distribution infrastructure 12. This distribution infrastructure may be, for example, a telephone network and/or a cable TV (CATV) system, preferably employing optical fiber and implementing asynchronous transfer mode (ATM) transmission protocols. The distribution infrastructure 12 delivers movies to individual homes based on the routing information supplied by the video server 10. There is a set top box 13 resident in each subscriber's home. This box receives and decodes the digital movie and converts it to a signal for display on a TV set or monitor 14. In addition, the system includes a "back channel" through which a viewer orders and controls the playing of the digital movies. The back channel routes commands from the set top box 13 back to the video server 10 via the distribution network 12. An alternative backchannel could be implemented with existing communications facilities such as telephone lines.

The primary function of the video server 10 is to route compressed digital video streams from their storage location to the requesting viewers. In addition to this basic function, the video server 10 should support the virtual VCR functions of the VOD system. At a minimum, the VCR functions to be supported are start, pause/resume, fast forward, and rewind.

There are two primary design approaches, currently under development, for the video server; these are the massively parallel processor (MPP) approach and the workstation approach. The primary practitioner of the MPP approach is Oracle Corporation running relational database management software on an nCUBE MPP. The Oracle system is being tested in several trial VOD systems, including the Bell Atlantic trial in the Washington, D.C., area. The distinguishing characteristics of the Oracle/NCUBE approach are the following:

The MPP consists of a few thousand independent computing elements, each with its own central processing unit (CPU) and memory. Each computing element hosts a database program that independently reads movies from a disk and then routes the movies to a destination line.

Each movie is partitioned (striped) across several disks so as to reduce contention for disk access among the computing elements. While the MPP approach seems to satisfy the requirements for the video server, the cost is high, requiring as it does a parallel relational database program in order to accomplish VOD data distribution.

Several trial VOD systems are exploring workstation based approaches. The Time Warner trial in Orlando, Fla., uses a Silicon Graphics Incorporated (SGI) workstation based server. A NYNEX trial will be based on a Digital Equipment Corporation (DEC) Alpha workstation, and a Pacific Telesys trial will use a Hewlett-Packard (HP) workstation. The Time Warner video server is illustrated in FIG. 2 and consists of five SGI workstation servers $20_1$ to $20_5$. Each workstation has a dedicated ATM connection to an AT&T ATM switch 21. The ATM switch 21 drives lines to the distribution infrastructure 22. Each workstation acts as an interface with the address of a specific set top box. The ATM switch 21 then routes the packets to the specific line that serves the neighborhood access node (NAN) $23_1$ to $23_n$ for the particular set top box. To the extent understood by the inventors, Modulators in FIG. 2 are used to modulate the video signals sent to the set top boxes over the cable network. Demodulators demodulate user input signals sent from set top boxes over the cable network.

Again, the workstation based server appears to meet the video server requirements, although the workstation throughput appears to be exhausted. From a cost standpoint, this approach is expensive requiring, as it does, high performance CPUs resident in the workstations which are only lightly utilized. Most of the workstation time appears to be used in direct memory accessing data from the disks to the ATM adapter. High performance servers are used so that the workstation backplane can support the data throughput requirements. Additionally, the ATM switch provides much higher data rates than are needed for the VOD application.

SUMMARY OF THE INVENTION

It is therefore an object of the present invention to provide a video server wherein the processing requirements at each computing element are reduced to only those needed for VOD, resulting in a less expensive processor with less memory and, hence, lower cost.

It is another object of the present invention to provide video data at a constant rate thereby eliminating the need for large buffers in the set top box.

It is still another object of the present invention to provide a video server which is capable of delivering data faster than real time, which allows the VOD server to serve multiple users with one switch output channel.

It is yet another object of the present invention to partition the disk vault into small groups of disks, referred to as partitions, allowing movies to be striped entirely within a partition and improving user response time.

It is a further object of the present invention to implement the video server switch with a programmable, dynamically reconfigurable switch element with internal storage, allowing multiple copies of movies to be stored within the switch and, consequently, permitting a switch to be generalized to serve more output ports than input ports without using broadcast techniques.

According to one aspect of the invention, there is provided a hybrid video server architecture that combines the best features of MPP and workstation designs into a cost effective high performance system. The solution according to the invention recognizes that it is not necessary to run a parallel relational database program in order to accomplish VOD data distribution. In fact, there are very few or, in some cases, no relations among data types, and indeed there is only one data type partitioned among the disks in a very regular (i.e., easily computable) way.

The hybrid architecture combines a workstation with a programmable and dynamically reconfigurable switching network to implement a low cost, minimal implementation of a video on demand server. The workstation provides control and routing information to the network which implements a minimal solution of an N×M non-blocking switch. In order to connect a VOD user (one of M switch outputs) with the appropriate source disk (one of N switch inputs), it is necessary to implement a switch network that has the following attributes:

- Each switch input and output must be able to sustain the 5.6 MB/sec data rate required to support multiple simultaneous compressed video streams.
- The switch must be able to map any permutation of the N inputs to the M outputs in a non-blocking fashion.
- The switch must be dynamically reconfigurable in real time, or near real time, upon command of the control workstation in order to support disk striping and a varying set of VOD subscribers.

Several networks, currently employed for switching and VOD applications, were rejected due to their complexity, size and expense. These include a full cross-bar switch, and a large binary hypercube, as employed in the nCUBE solution. The hybrid architecture combines a Benes network with the programmable and dynamically reconfigurable switching network technology to implement a dynamically reconfigurable VOD server in a minimal and unique manner.

The detailed description of the preferred embodiment of the invention demonstrates that the Benes network provides a uniquely minimal solution to the VOD switch topology, requiring significantly less switch elements to implement a VOD server than current state of the art practice. Although the Benes network solution could be applied to multiple MPP technologies, in a preferred embodiment of the invention, the EXECUBE technology provides a hardware efficient method of packaging two processor controlled 2×2 switch elements, capable of 5.6 MB/sec data rate, on a single chip. Consequently, a Benes network implemented with EXECUBE technology provides even further minimization which results in a VOD server that requires significantly less parts, power, volume and cost than current state of the art practice.

The resulting VOD server, configured with the appropriate disk storage, provides an elegant low cost, but full featured, VOD server that can be affordably installed at regional cable distribution centers nationwide.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
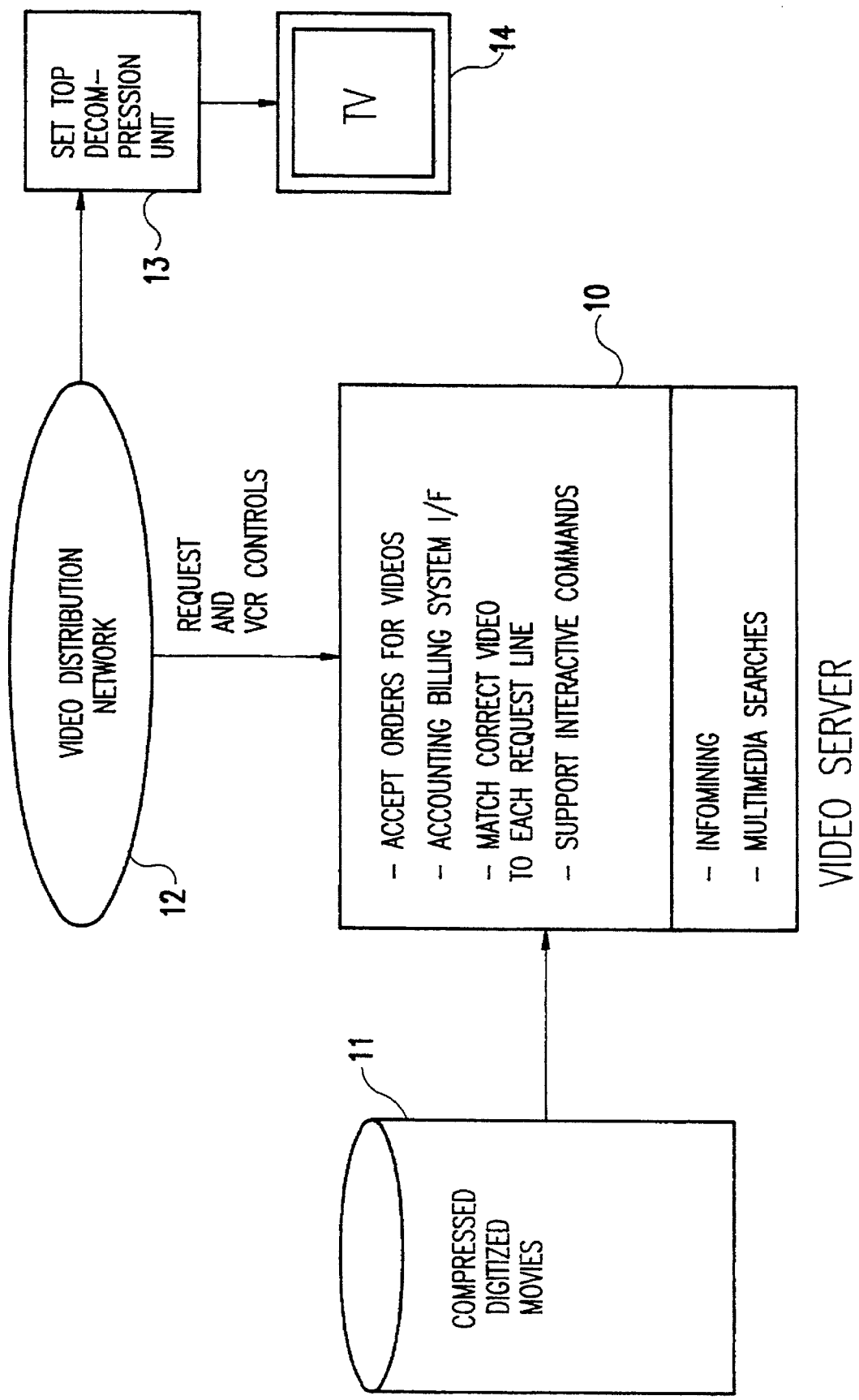
FIG. 1 is a functional block diagram of a VOD system.
Figure 2:
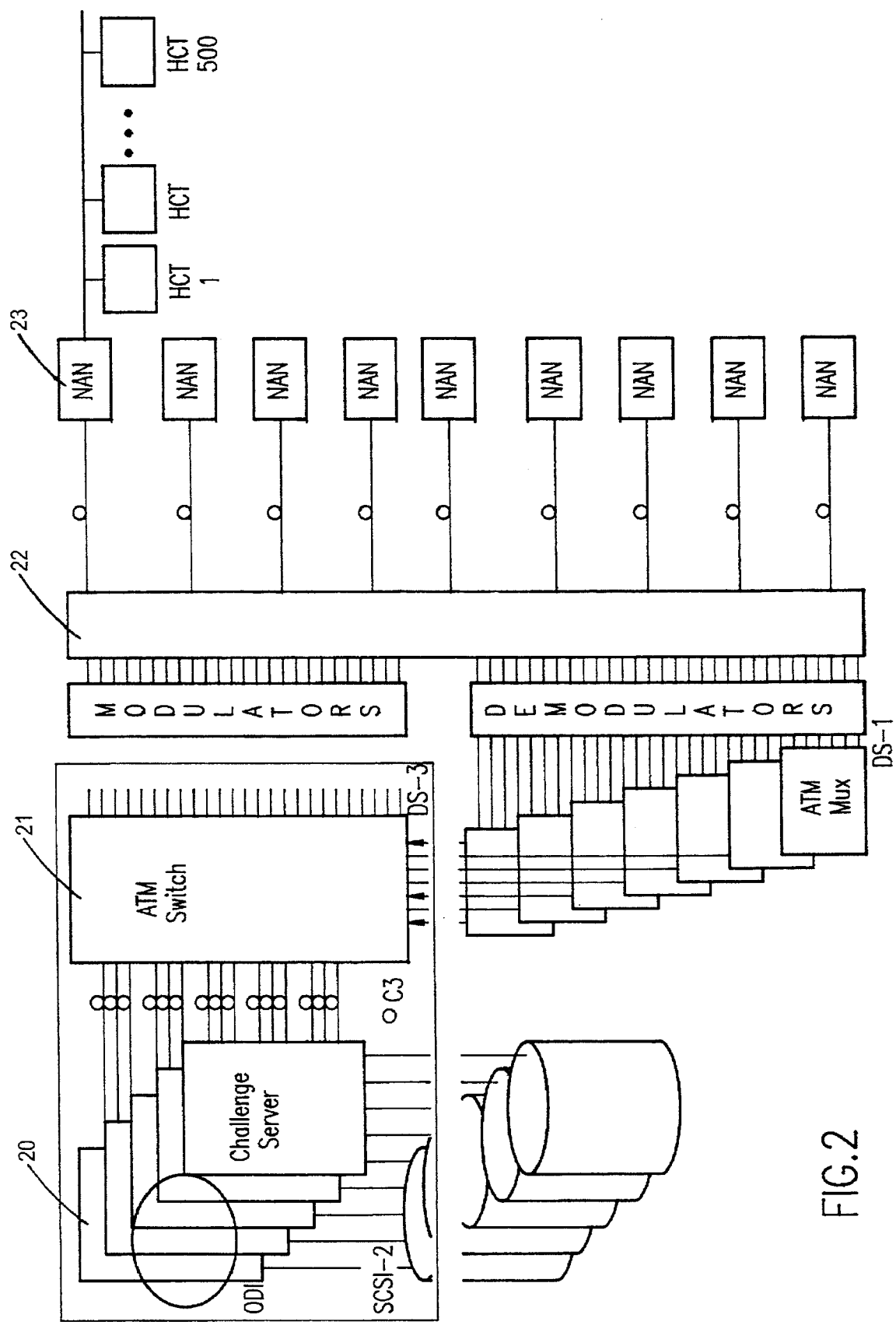
FIG. 2 is a block diagram of the Time Warner video server.
Figure 3:
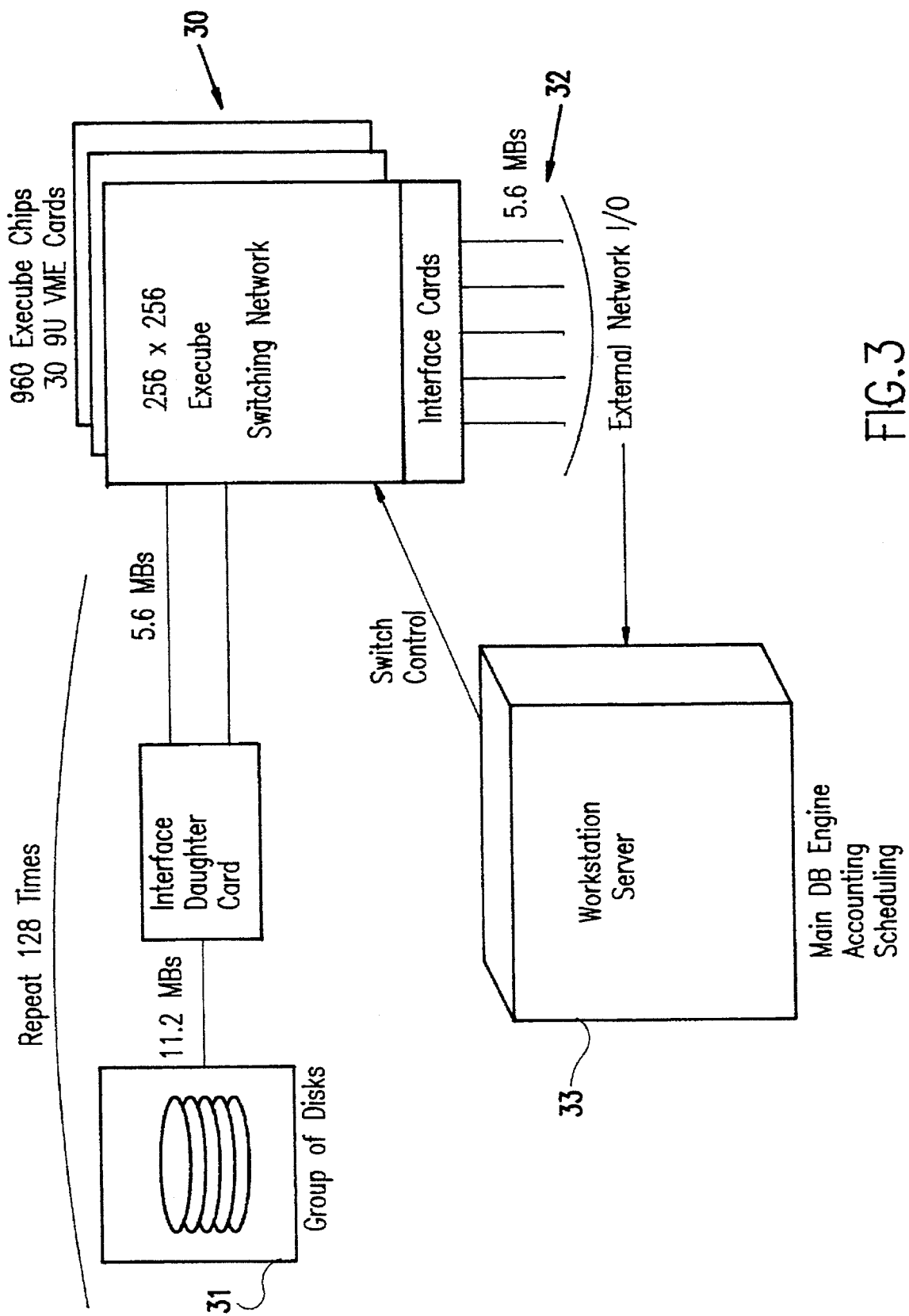
FIG. 3 is a block diagram of the EXECUBE video switch configuration for the VOD server according to the invention.

Referring again to the drawings, and now to FIG. 3, there is shown the hybrid video server architecture employing the EXECUBE video switch configuration according to a preferred embodiment of the invention. The key element of this server is a NxM switch which is shown as a 256×256 switch 30 that can route data blocks from any disk in group of disks 31 to any of 256 lines 32. The EXECUBE switch 30 is controlled from a single high performance workstation 33, such as an IBM RISC System/6000 workstation, which transmits service requests to the switch and which maintains administrative records, such as billing information.

Although the tasks performed by the video server are conceptually trivial, the preferred embodiment of the invention is driven by the demanding data rate requirements of the system. The configuration shown in FIG. 3 services a maximum of 3584 active users where each user requires 3 Mbits/sec (0.375 MBytes/sec) of low bit rate MPEG-2 server is capable of delivering data faster than real time, a single 6 MByte/sec output channel supports fourteen simultaneous 0.375 MByte/sec users. In this implementation, 3000 movies are stored on 1500 disk files where each disk has a capacity of 4 GBytes and stores two complete movies. It is the task of the video server/switch to connect the appropriate disk to the correct user. The video switch 30 is configured as a 256×256 matrix where each of the 256 input or 256 output lines can sustain a video data rate of approximately 6.0 Mbyte/sec. Six 1 Mbyte/sec disk file data streams are combined into one 6 MByte/sec switch input, and the 256 (6 MByte/sec) output lines support the 3584 active simultaneous users.

The video switch 30 is implemented completely from EXECUBE chips and is supported by 128 input adapter cards in which 12 fast/wide small computer system interface (SCSI) disks are adapted to two EXECUBE switch channels. (An alternative implementation would adapt 6 low cost disks to one EXECUBE switch input.) In a similar manner the switch is also supported by 256 output adapter cards 33 in which each EXECUBE switch output is adapted to the interface protocol for the video distribution network. Output adapter cards can be provided for a number of different protocols including the DS-3 and ATM networking standards.

The EXECUBE approach reduces costs in two ways. First, by retaining the massively parallel input/output (I/O) approach of the MPP architecture, the number and complexity of workstations needed in the server is reduced. Second, the solution is more specific to the video distribution problem than is the MPP architecture. Each EXECUBE computing element is simpler than an nCUBE computing element, for example, and the MPP software is a simple single program, multiple data (SPMD) switching and routing program.

The hybrid VOD architecture can be thought of as a workstation with a low cost, special purpose attached I/O box, that is, the EXECUBE switch. Network control and routing is performed by the compute intensive workstation, and high speed switching and I/O is performed in an optimal manner by the attached EXECUBE switch. The EXECUBE architecture optimizes the high data rates and robust connectivity inherent in MPPs without paying the penalty for floating point intensive scientific compute engines. EXECUBE combines a 6.25 MIPS (millions of instructions per second) control processor, 64 Kbytes of storage, and a 7 Mbyte/sec switch element in each of its processing elements (PEs). By combining eight control and I/O intensive PEs on a single chip, it becomes an ideal building block for large switch networks.

Each EXECUBE PE is capable of computing its own local routing within the switch network based on commands broadcast by the workstation. Several variations of this control scheme are possible:

Each PE can store a table of possible routes. When the switch multiplexes to a new data stripe the PE simply steps to a new prestored table entry and connects to a new route. When a new subscriber is added, the workstation broadcasts new control tables to the PEs.

Each PE computes a table of possible routes which it stores. When the switch multiplexes to a new data stripe the PE steps to the new table entry. When a new subscriber is added, the workstation broadcasts a sequence of macros which the PEs execute to locally generate new control tables.

Each PE computes a table of possible routes which it stores. When the switch multiplexes to a new data stripe the PE steps to the new table entry. When a new subscriber is added the workstation broadcasts top level parameters which are interpreted by local PE stored programs to generate new control tables.

Figure 4A:
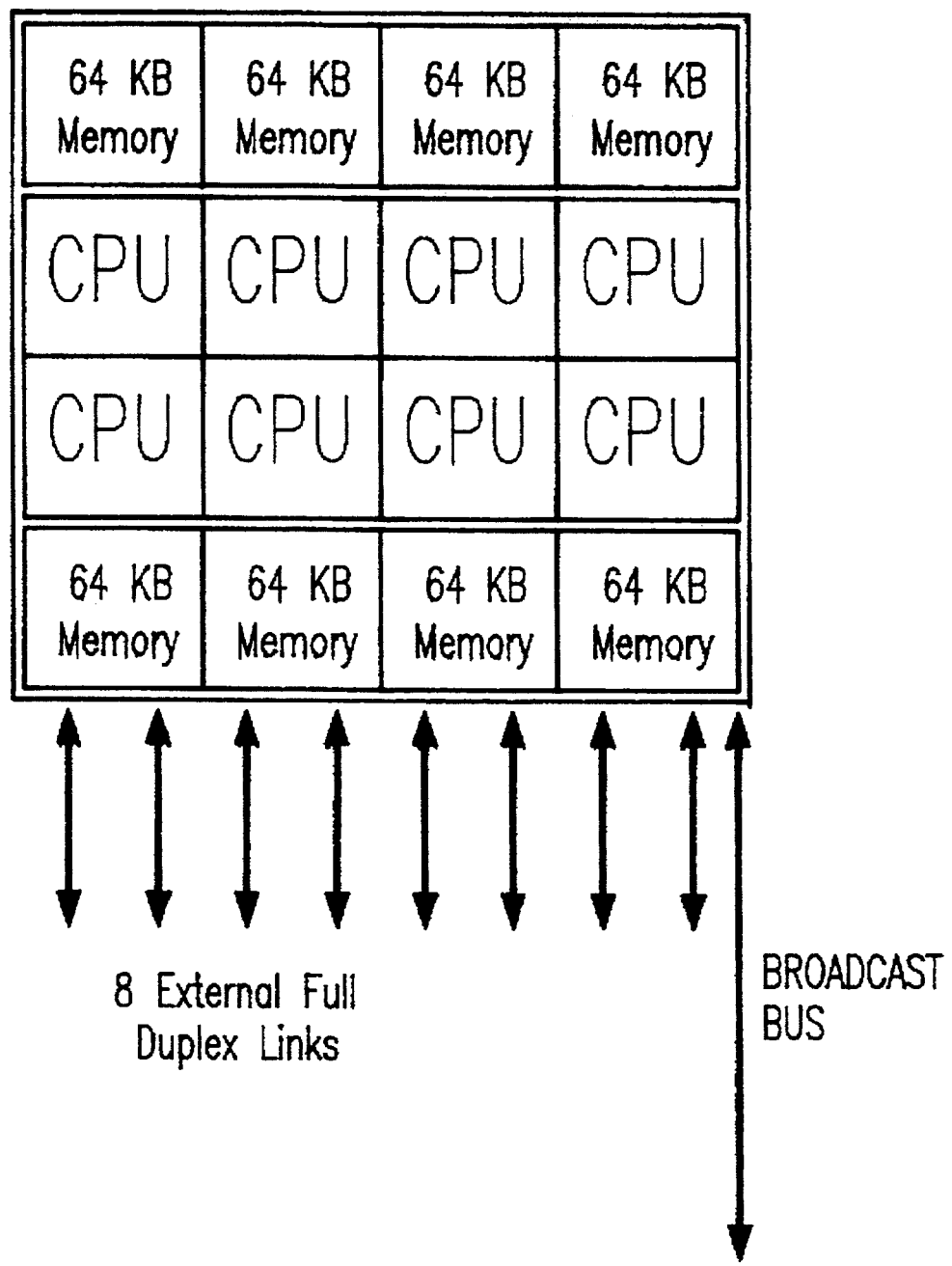
FIG. 4A is a physical view of an eight processing element (PE) EXECUBE chip.

FIG. 4A is a physical view of a single EXECUBE chip comprising eight 16-bit, 6.25 MIPS CPUs, each with its own independent 64 kilobyte (KB) random access memory (RAM). Each CPU and associated RAM is referred to as a processing element (PE) and operates, under the control of the workstation, to control the switching of video data to a designated output line. Besides the CPU logic and memory, the chip includes inter node communications ports (not shown), indicated in the drawing figure as eight external full duplex links, and a broadcast bus, which is used by the workstation to control the switching configuration of the switching network.

Figure 4B:
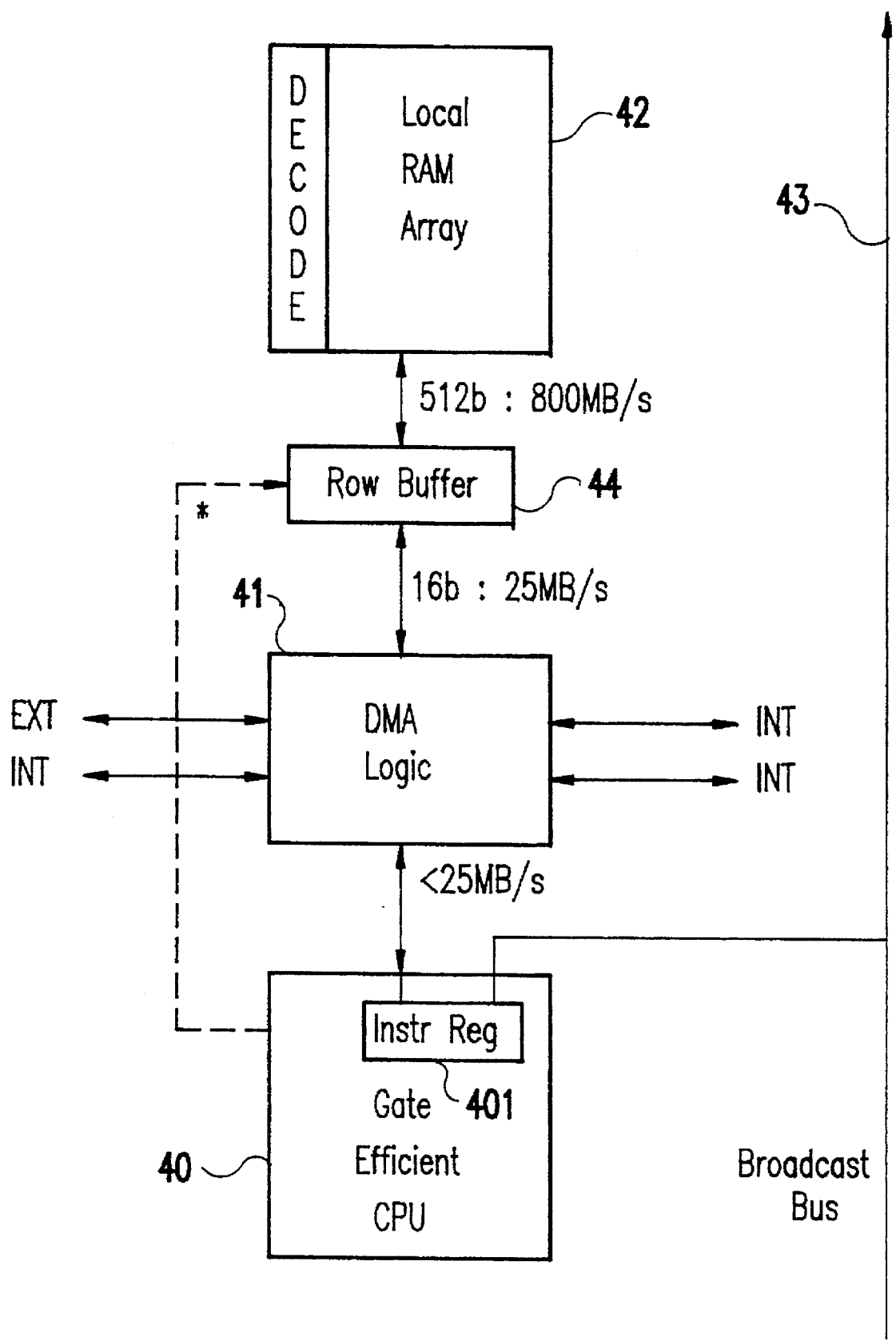
FIG. 4B is a block diagram of one PE in the EXECUBE chip.

The CPU logic and memory for one processing element (PE) is shown in more detail in FIG. 4B and comprises a gate efficient 16-bit CPU 40, direct memory access (DMA) logic 41 and local RAM array 42. The DMA logic 41 communicates with the CPU 40 via an internal instruction register 401 which is also connected to a broadcast bus 43. The DMA logic 41 also communicates with the RAM array 42 via an intermediate row buffer 44. One of the external links is connected to the DMA logic 41, and there are additional internal links connecting the DMA logic to other PEs on the chip.

Figure 4C:
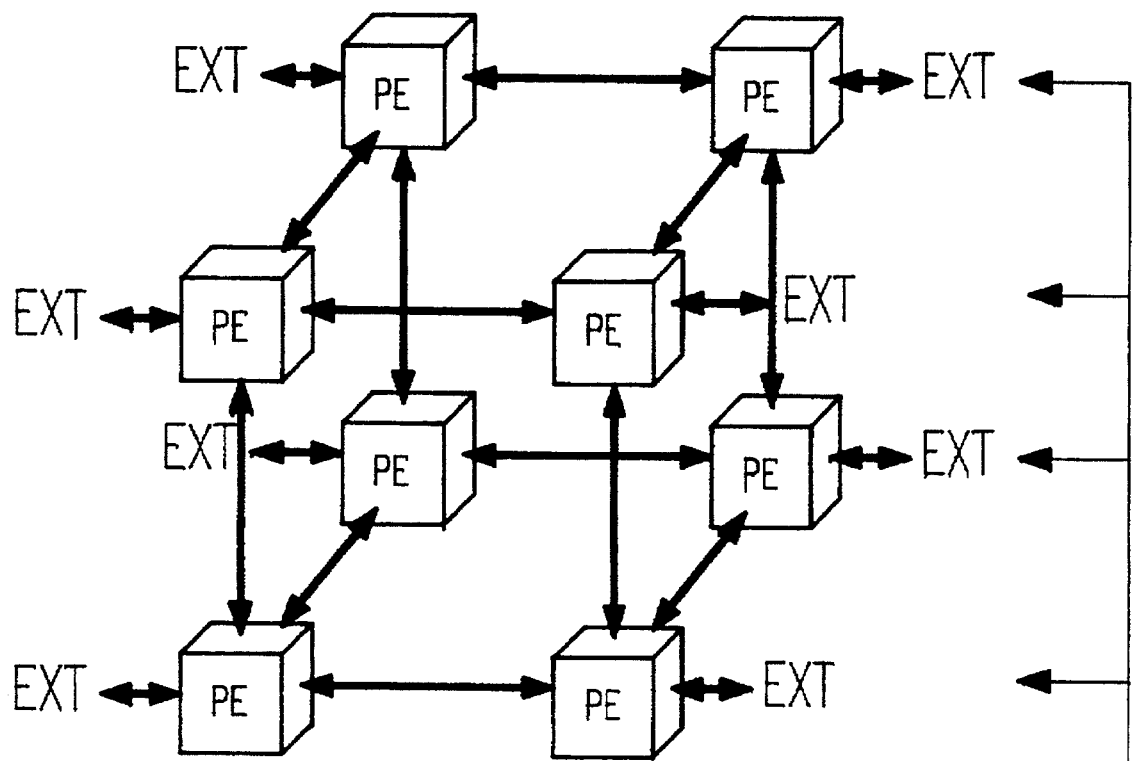
FIG. 4C is a topological view of the EXECUBE chip.

The topology of the EXECUBE chip with the eight CPUs is shown in FIG. 4C where each block labeled PE is interconnected to three other PEs in a cubic array of eight PEs. The eight PEs can be run in multiple instruction, multiple data (MIMD) mode, where each CPU obtains its own instructions from its own 64 KB RAM or in single instruction, multiple data (SIMD) mode where instructions can be sent from the workstation via the broadcast bus 43 directly into each CPU's instruction register 401. Further information on the EXECUBE may be had with reference to an article by one of the inventors, Peter M. Kogge, entitled "EXECUBE—A NEW ARCHITECTURE FOR SCALEABLE MPPS", ICPP'94. European Patent Applications EPS 570950 entitled "Advanced Parallel Array Processor (APAP)", EPS 57095 1 entitled "Advanced Parallel Array Processor Mechanical Packaging", EPS 570741 entitled "Controller for SIMD/MIMD Processor Array", and EPS 570729 entitled "APAP I/O Programmable Router" also provide further information on EXECUBE and are hereby incorporated by reference.

Figure 4D:
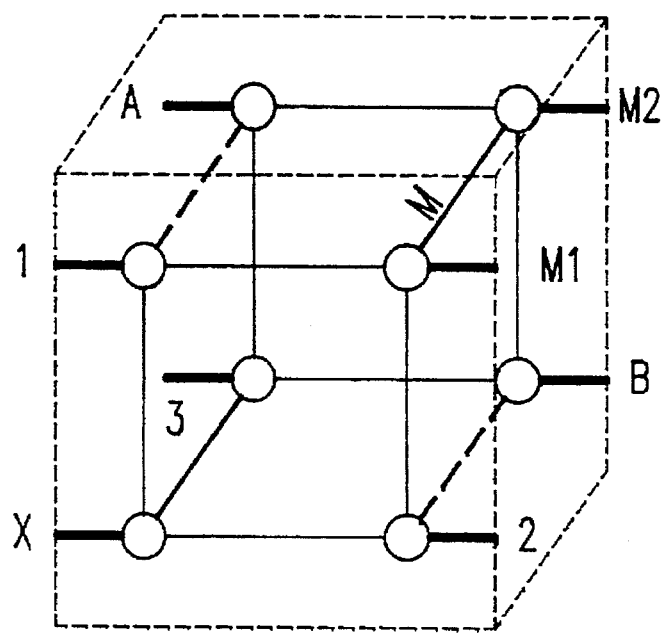
FIG. 4D is a topological view illustrating how a single EXECUBE chip can be configured to implement two 2×2 crossbar switches.
Figure 4E:
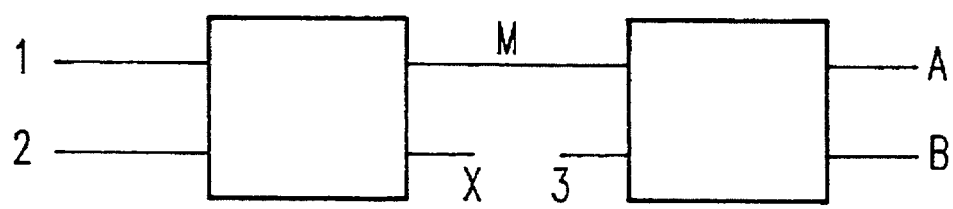
FIG. 4E is a block diagram of the two 2×2 crossbar switches shown in FIG. 4E.

As shown in FIGS. 4D and 4E, each EXECUBE chip is configured as a simple binary hypercube where an EXECUBE PE forms each of the eight "corners" of the cube. This architecture is very flexible, and it permits a variety of applications within switching networks. It is desirable to configure the existing EXECUBE chip as atomic 2×2 cross bar switches, as many different network topologies can be configured from 2×2 cross bar switch elements. FIG. 4D shows an EXECUBE chip configured as two 2×2 cross bar switch elements. This is accomplished in software by using the eight PE external interfaces which are labeled 1, 2, 3, A, B, X, M1 and M2, and internal interface M. The dashed lines in FIG. 4D indicate connections that are not enabled when the EXECUBE chip is configured as two 2×2 switches. The first cross bar switch is comprised of inputs 1, 2 and outputs M 1, X. The second cross bar switch is comprised of inputs M2, 3 and outputs A, B. A block diagram of the two 2×2 cross bar switch elements is shown in FIG. 4E. Switching permutations are shown in the table below:

| SWITCH | STATE | INPUT | CONNECTED TO OUTPUT |
| --- | --- | --- | --- |
| FIRST | STRAIGHT | 1 | M1 |
| | | 2 | X |
| | CROSS | 1 | X |
| | | 2 | M1 |
| SECOND | STRAIGHT | M2 | A |
| | | 3 | B |
| | CROSS | M2 | B |
| | | 3 | A |

Internal chip interface M can be used to connect output M1 with input M2. This allows the two cross bar switch elements to connect together within the same chip, which is useful in building up the larger network topologies required to implement the Video on Demand Server switch.

Figure 5:
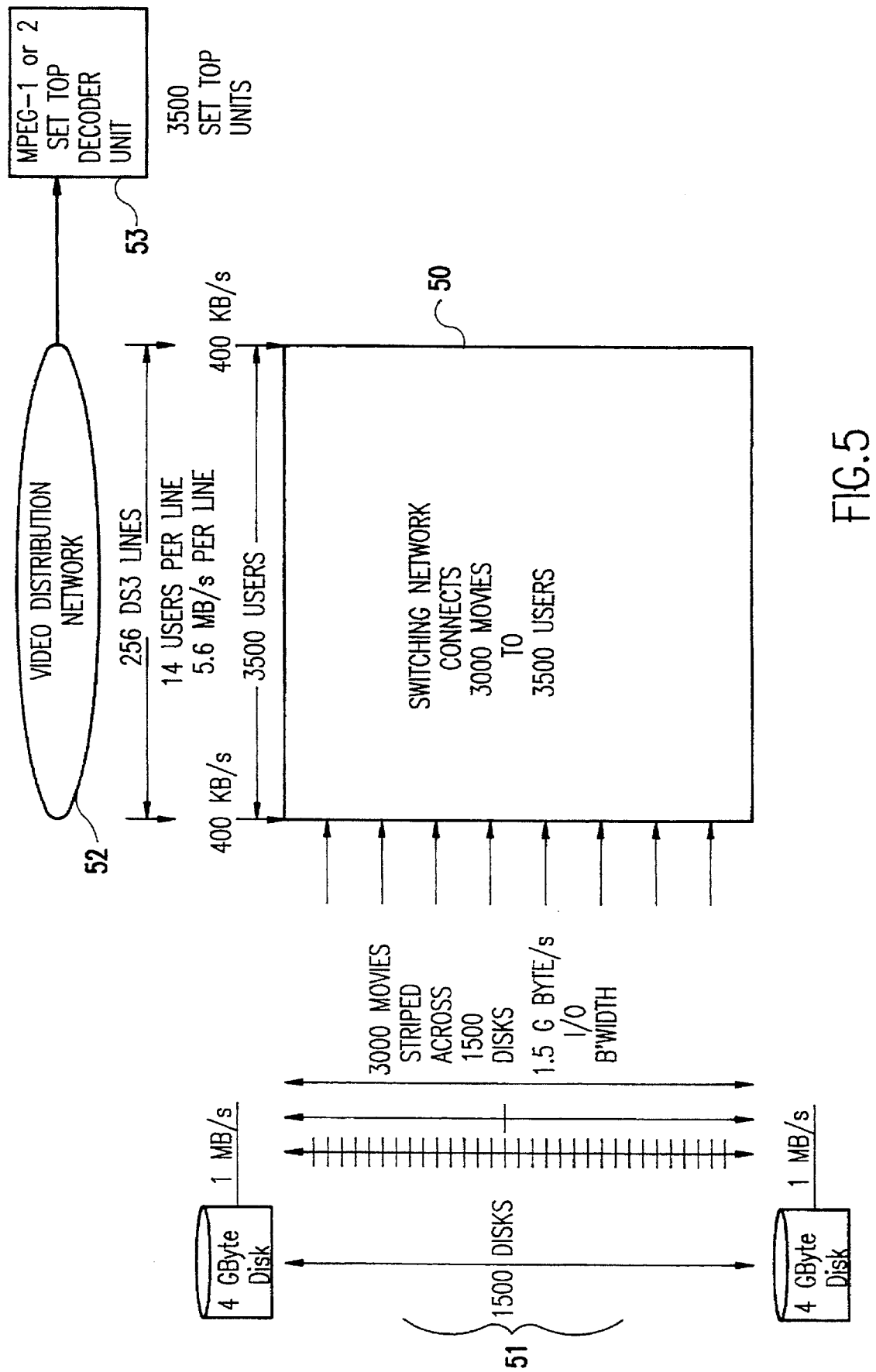
FIG. 5 is a block diagram of a specific example of a VOD system implemented with the EXECUBE video switch configuration of FIG. 2.

A specific example of an EXECUBE video server is illustrated in FIG. 5 and comprises a switching network 50 of EXECUBE chips controlled by a workstation (not shown). In this example, 3000 movies are striped across 1500 disks in a disk array 51. The video distribution network 52 is composed of 256 lines with fourteen users per line; e.g., the distribution network is capable of supplying approximately 3500 users total. Each user has a Moving Pictures Expert Group (MPEG) set top decoder unit 53 to decode the digital signal and supply a compatible signal to the user's television.

The implementation of the video server comprising the workstation and the EXECUBE switch is a function of two design decisions; the data striping technique across the 1500 disk array 51 and the routing procedure for determining how to set the switch 50. The data striping technique is such that data from any disk must be routable to any output. It is assumed that all 256 lines are being simultaneously fed with data from different disks. Thus, the switch must support full 256×256 non-blocking operation.

In order to achieve an efficient and practical implementation the switching network topology must be carefully chosen so as to minimize the number of components required to implement the 256×256×6 MByte/sec video switch (50 in FIG. 5). The table below illustrates the maximum, theoretical minimum and Benes switch configurations for the switch.

| NETWORK TYPE | REQUIRED SWITCH ELEMENTS | NUMBER OF SWITCH ELEMENTS REQUIRED FOR A 256 × 256 SWITCH (N = 256) |
|---|---|---|
| FULL CROSSPOINT | $(N/2)^2$ | 16,384 |
| BENES | $2(\log_2 N - 1) + 1 \times 2^{(LOGN-1)}$ | 1,920 |
| MINIMAL THEORETICAL SORT IMPLEMENTATION | $N \log_2 N/2$ | 1,024 |

The maximum configuration consists of a full crosspoint switch which allows any input to attach to any output. In addition, the crosspoint switch also allows a single input to broadcast to any combination of outputs. It is important to note that by stripping multiple copies of a movies across the disk vault, the broadcast capability can be realized without using a full crosspoint network. The crosspoint network would require $(N/2)^2$ or 16,384 (2×2) switch elements.

It is well understood that a minimum sort operation, in which any random combination of inputs is mapped to a well ordered list of outputs, can be accomplished in $M og_2 N/2$ compare and exchange operations. If we use 2×2 switch elements for the compare and exchange operations, we can achieve a theoretical minimum of 1024 switch elements. However, the resulting networks are not well ordered and practical.

The Benes network which has the properties of being rearrangeable and non-blocking, was chosen for this implementation since it meets our requirements with a near minimal 1920 switch elements in a well ordered and practical topology. For a description of the Benes network, see for example *Computer Architecture and Parallel Processing* by Kai Wang and Faye Briggs, McGraw Hill (1984), pages 337–338. Since an EXECUBE chip can implement two switch elements, then the entire switch network (50 in FIG. 5) is implemented in just 960 chips or thirty 9U-sized VME boards. The entire server, less disk vault, when packaged with the disk input and network output adapter boards described elsewhere will fit into one or two 6 foot high racks.

This compares very favorably with the nCUBE implementation which requires many racks to implement its VOD switch based on the hypercube topology.

The Benes network, composed of 2×2 switch elements, guarantees that a routing exists so that the inputs to the switch can be rearranged in any permutation at the outputs. This means that any disk can be routed to any output, and it is guaranteed that the necessary path through the network can be found regardless of what other simultaneous routes are required through the switch. The Benes network provides this capability for the video switch application because all block transfers from the disks are barrier synchronized. Barrier synchronization forces all disk transfers to occur in a synchronous manner, at a common point in time. This eliminates the potential network conflicts that would be caused by asynchronous transfers originating from a large number of disks.

Figure 6A:
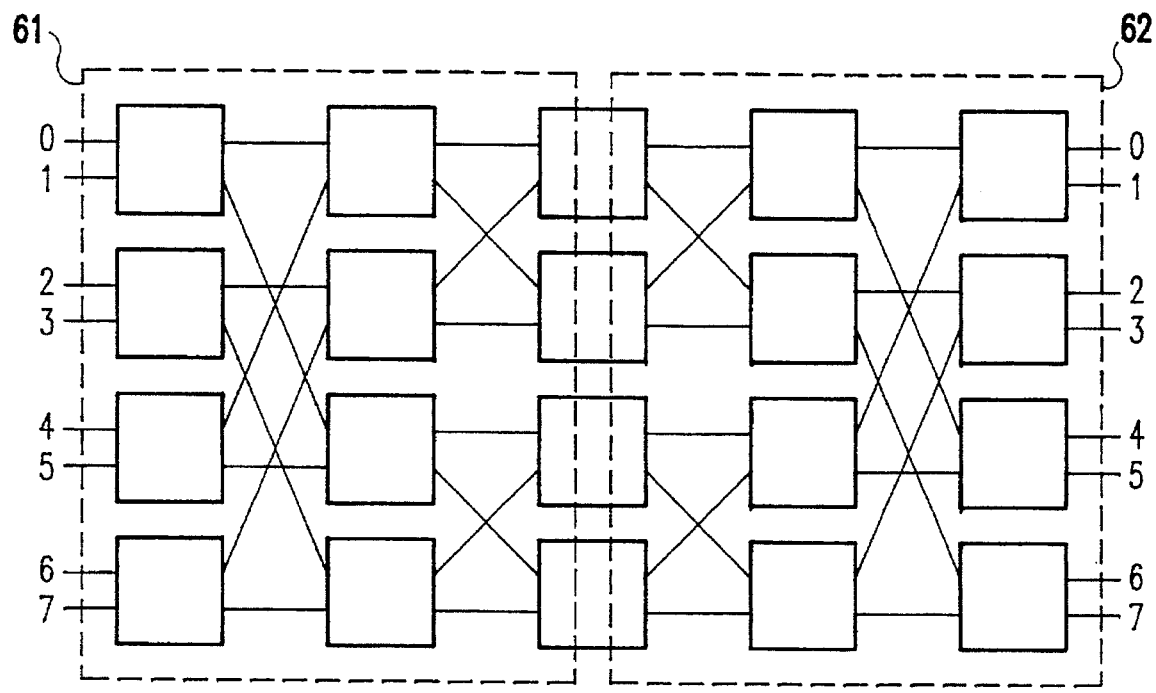
FIG. 6A is a block diagram of an example of an eight input Benes network.

An example of an 8×8 Benes network is shown in FIG. 6A and consists of two back-to-back butterfly networks 61 and 62, reflected about a central stage. The table below shows one example of a desired switching permutation. As previously explained, a broadcast capability is not required; therefore, each input need only connect to a single output.

| input | output |
|---|---|
| 0 | 5 |
| 1 | 3 |
| 2 | 4 |
| 3 | 7 |
| 4 | 0 |
| 5 | 1 |
| 6 | 2 |
| 7 | 6 |

Figure 6B:
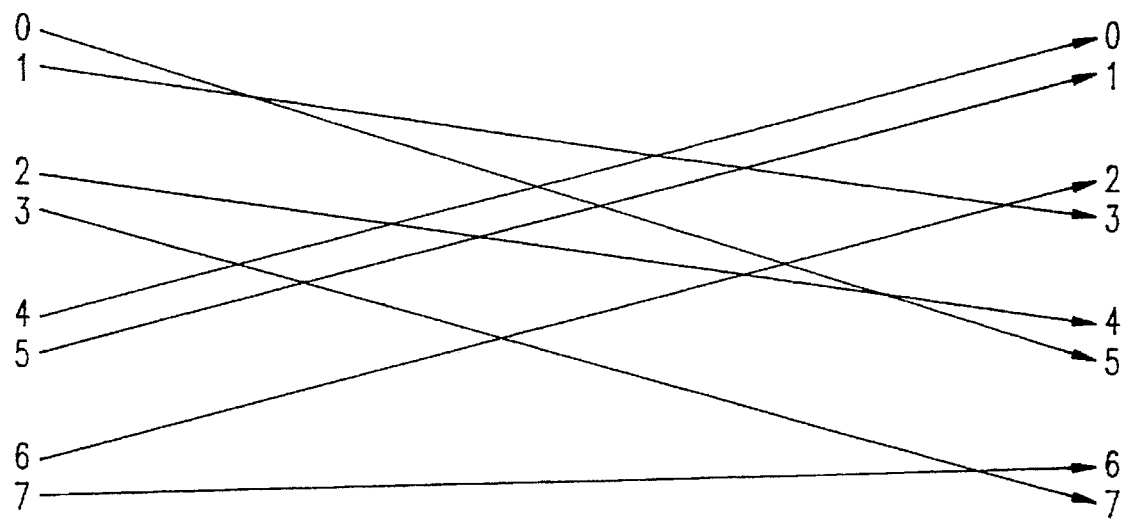
FIG. 6B is a diagram showing an example of switching connections of the Benes network of FIG. 6A.
Figure 7:
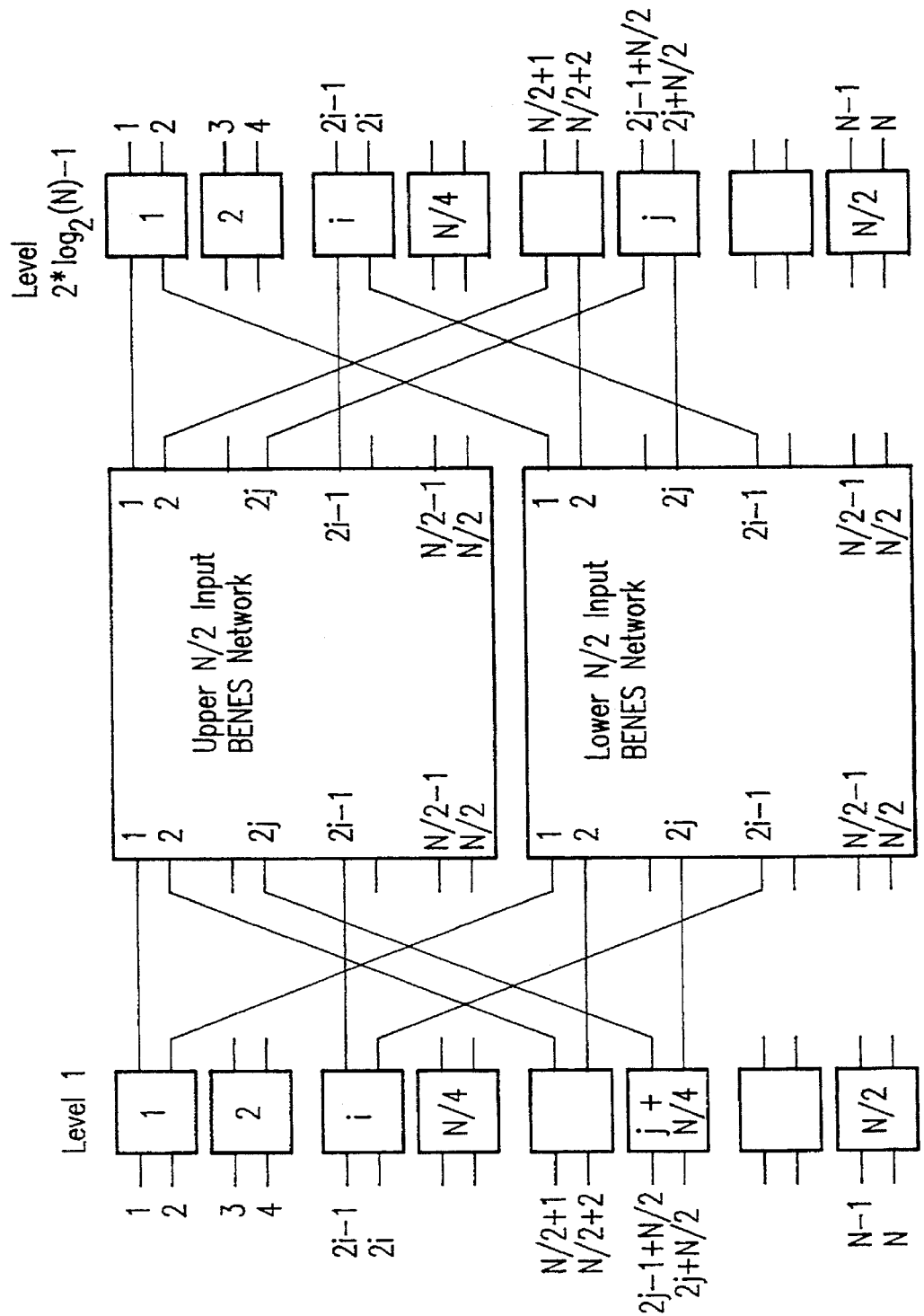
FIG. 7 is a block diagram of a Benes network.

FIG. 6B shows the switch paths required to map the example permutation of the inputs to the outputs set out in the table above. FIG. 7 is a generalized form of the Benes network which illustrates the mathematical relationships used to calculate required switch elements.

The EXECUBE video server architecture is based on a data striping approach in which each viewer accesses a specific disk for a very short length of time. This enables several different viewers to access movies that share the same disk and to watch the same movie at different points in time.

Multiple disks are grouped into partitions. Complete movies are stored within a partition to minimize user response time on start up. The term striping refers to how the blocks of a movie are allocated to one partition. The blocks are distributed evenly among all the disks in a partition, in a sequential fashion, one block for each disk tied to an input channel and then in a similar fashion to the disks on the next input channel. When the end of a partition is reached, the sequencing starts over with the disks for the first input channel for the partition. Users cycle through the input channels to the switch in a circular fashion, with a new switch path needed each time a transition from a disk on one input channel to one on the next input channel is made.

Figure 8:
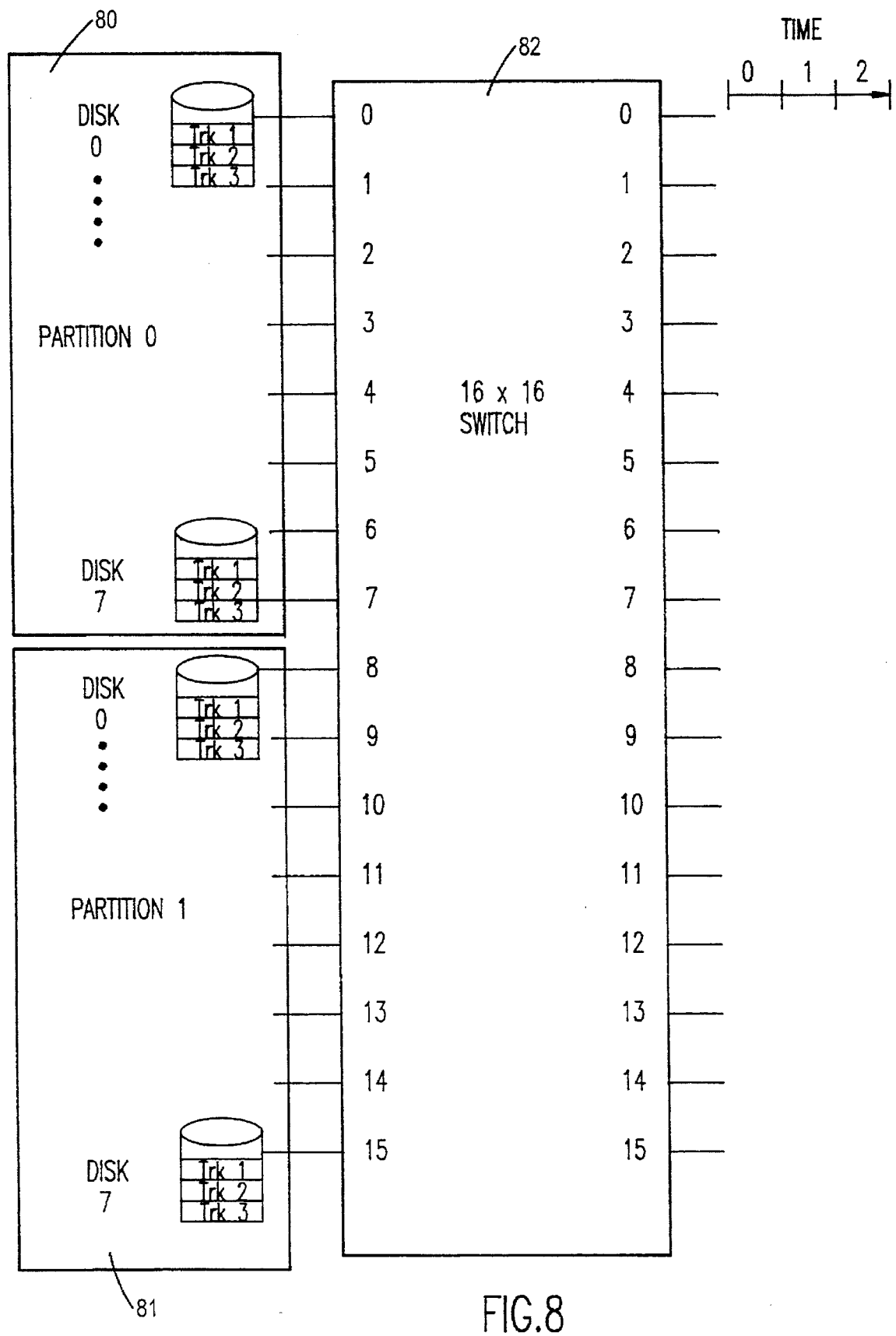
FIG. 8 is a simplified example of the video server architecture.

FIG. 8 illustrates a simplified example of the VOD server, which shows the method of striping movies across disk partitions. In this example, two partitions of disks 80 and 81 are attached to a 16×16 switch 82. Each partition is comprised of eight disks, and each of these disks has three tracks of compressed MPEG movie data. It is the task of the 16×16 switch and the control workstation to select the appropriate disk tracks and configure the switch to connect the appropriate movie segment to the appropriate switch output for a given time slot.

The disk input columns in the table below show how movie segments, designated $M_iS_j$ (where i represents the movie number and j represents the segment number) are mapped onto the disk tracks.

DISK STRIPING EXAMPLE

| Disk Inputs | | | | | | | Output Blocks Over Time | | | |
|---|---|---|---|---|---|---|---|---|---|---|
| Partition | Disk | Track 2 | Track 1 | Track 0 | Switch Input | Switch | Switch Output | Time 0 | Time 1 | Time 2 | Time 3 |
| 0 | 0 | M1S0 | M0S8 | M0S0 | 0 | | 0 | 4-M0S4 | 5-M0S5 | 6-M0S6 | 7-M0S7 |
| | 1 | M1S1 | M0S9 | M0S1 | 1 | | 1 | 3-M0S3 | 4-M0S4 | 5-M0S5 | 6-M0S6 |
| | 2 | M1S2 | M0S10 | M0S2 | 2 | | 2 | 2-M0S2 | 3-M0S3 | 4-M0S4 | 5-M0S5 |
| | 3 | M1S3 | M0S11 | M0S3 | 3 | | 3 | 1-M0S1 | 2-M0S2 | 3-M0S3 | 4-M0S4 |
| | 4 | M1S4 | M0S12 | M0S4 | 4 | | 4 | 0-M0S0 | 1-M0S1 | 2-M0S2 | 3-M0S3 |
| | 5 | M1S5 | M0S13 | M0S5 | 5 | | 5 | — | 0-M0S0 | 1-M0S1 | 2-M0S2 |
| | 6 | M1S6 | M0S14 | M0S6 | 6 | | 6 | — | — | 0-M0S0 | 1-M0S1 |
| | 7 | M1S7 | M0S15 | M0S7 | 7 | | 7 | — | — | — | 0-M0S0 |
| 1 | 0 | M2S0 | M0S8 | M0S0 | 8 | | 8 | 11-M2S3 | 12-M2S4 | 13-M2S5 | 14-M2S6 |
| | 1 | M2S1 | M0S9 | M0S1 | 9 | | 9 | 10-M2S2 | 11-M2S3 | 12-M2S4 | 13-M2S5 |
| | 2 | M2S2 | M0S10 | M0S2 | 10 | | 10 | 9-M2S1 | 10-M2S2 | 11-M2S3 | 12-M2S4 |
| | 3 | M2S3 | M0S11 | M0S3 | 11 | | 11 | 8-M2S0 | 9-M0S9 | 10-M2S2 | 11-M0S3 |
| | 4 | M2S4 | M0S12 | M0S4 | 12 | | 12 | 15-M0S7 | 8-M0S8 | 9-M0S9 | 10-M0S10 |
| | 5 | M2S5 | M0S13 | M0S5 | 13 | | 13 | 14-M0S6 | 15-M0S5 | 8-M0S8 | 9-M0S9 |
| | 6 | M2S6 | M0S14 | M0S6 | 14 | | 14 | 13-M0S5 | 14-M0S6 | 15-M0S7 | 8-M0S8 |
| | 7 | M2S7 | M0S15 | M0S7 | 15 | | 15 | 12-M0S4 | 13-M0S5 | 14-M0S6 | 15-M0S7 |

From the table, it can be seen that movie 0 ($M_0S_j$) is striped across both partitions, movie 1 is striped across partition 0, and movie 2 is striped across partition 1. Upon examination of partition 0, we see that $M_0S_0$ is on disk 0, track 0, and $M_0S_1$ is on disk 1, track 0. This is continued in a sequential fashion, with a movie segment of movie 0 allocated to all the disks in partition 0, until all of track 0 is exhausted. At this point, the segments of movie 0, starting with $M_0S_8$ on disk 0, are allocated to all track 1s in the partition. In order for a given user to view movie 0, track 0 and then track 1 of partition 0 must be read out in a sequential, rotating fashion, such that track 0 (disks 0 to 7) are read followed by track 1 (disks 0 to 7).

The output columns in the table show the switch and movie segment configurations for each user, for each time slot. In the example shown, output 0 is viewing $M_0$. This requires the switch to attach output 0 to input 4 to access $M_0S_4$ at Time 0, input 5 to access $M_0S_5$ at Time 1, and input 6 to access $M_0S_6$ Time 2.

When viewed as a system, the simplified example in FIG. 8 is servicing sixteen simultaneous users, with movie 0 on outputs 0–7 and 12–15, and movie 2 on outputs 8–10. The maximum startup delay to service a new user is equal to the number of disks in the partition, which in the case of the simplified example is eight time slots. It can be seen that by keeping the number of disks in a partition relatively small, the startup latency will be minimized.

Figure 9:
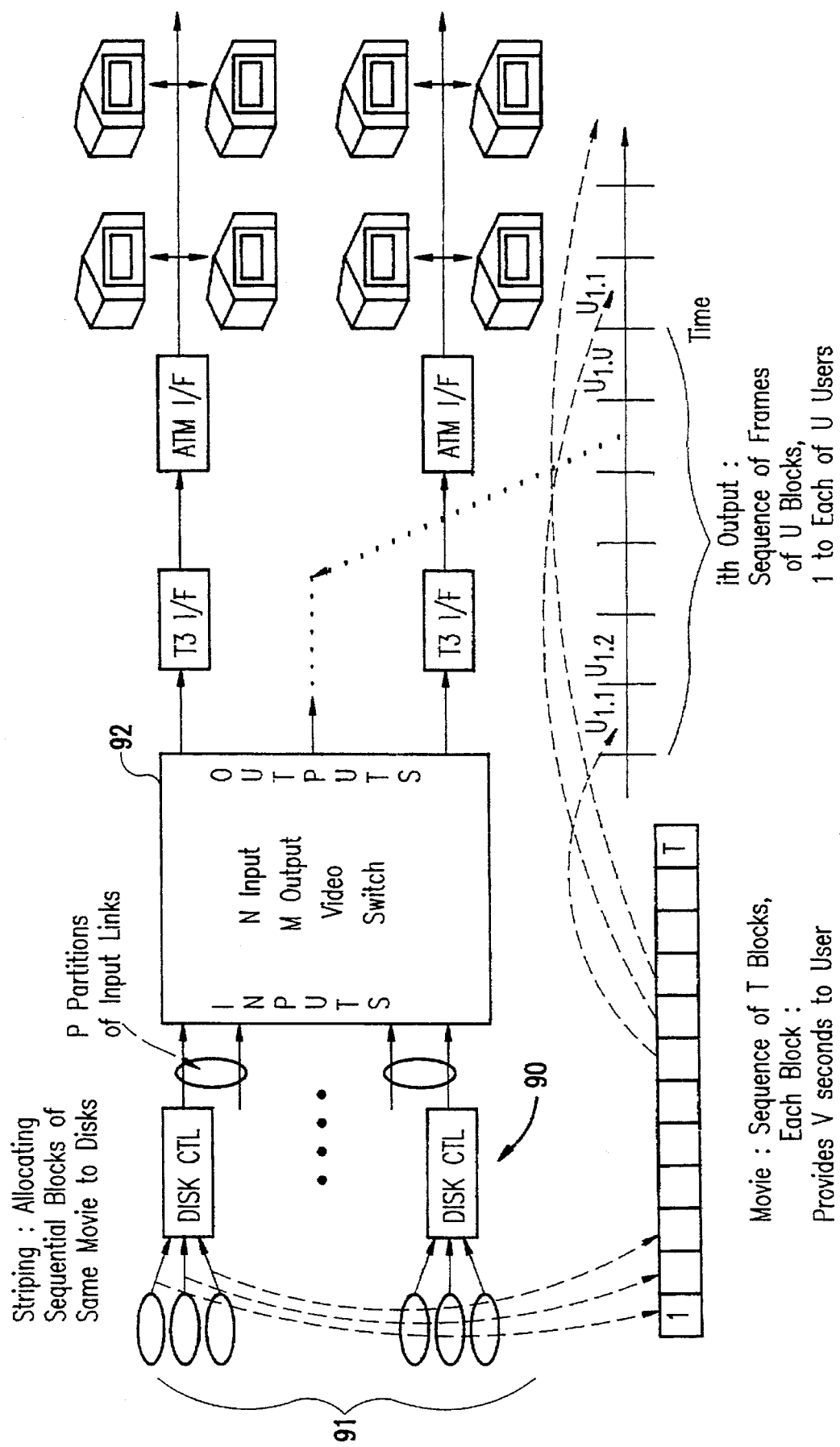
FIG. 9 is a block diagram of the video server architecture illustrating the striping of movies on a plurality of disks.

FIG. 9 illustrates the general concept for the video on demand server. Multiple disk input adapters 90, which in turn control multiple disks, D, 91, are grouped into partitions, P. Users, U, cycle through the input channels to the switch 92 in a circular fashion, with a new switch path needed each time a transition from a disk on one input channel to one on the next input channel is made. Movies are viewed as a sequence of T blocks, where each block provides V seconds of viewing time and requires R seconds to be read from the disk. The switch is configured with N inputs and M outputs, where M can be greater than N, since the switch can store copies of disk blocks within its internal structure. A signal switch output line (one of M) can service multiple users, U, since the switch output data rate far exceeds the requirements of a single user. This is a general concept which can be applied to various video server configurations. The parameters D, P, U, T, V, R, N, and M can be scaled to fit any size video server. The remainder of this description will discuss the parameters associated with a 3584 active user system shown in FIG. 5. This is only a single design among many possible designs, but it is representative of a modest, low cost VOD server configuration for a mid-sized community of 35,000 users, assuming only about ten percent of the users are expected to be active at any one time.

In order to supply the input data rate required of the server shown in FIG. 5 (1.5 GB/sec), each of the approximately 1500 disks in the disk array (51 in FIG. 5) has an output rate of 1 MB/sec. By using relatively low data rate disks, the overall price of the storage system is minimized. Of course, this is a tradeoff against the higher number of disk controllers necessary to simultaneously access 1500 disks. The set of 1500 disks is logically separated into about 100 partitions, resulting in about 15 disks per partition. Each partition stores some number of complete movies, allocated across the partition in data blocks. An initial design assumes 4 MB disks and 2 MB/movie, resulting in thirty complete movies stored on each partition.

Each partition supplies data at a combined rate of 15 MB/sec, thereby being able to serve up to thirty-seven simultaneous users at 0.375 MBytes/sec each. Considering any disk in the partition, the data on that disk represents staggered (in time) segments from all thirty seven movies.

To serve a movie, the switch sequentially reads one block from each disk in the partition, beginning with the first disk. After 32 KB are read from each of the fifteen disks in succession, the server returns to the first disk. This "rotation" among the fifteen disks continues for the duration of the movie.

It is desirable to allocate a small number of disks per partition so that the response time of the server is low. Since each new viewer cannot begin watching until it can access disk 1 in its assigned partition, the server must wait until an empty time slot in the rotation becomes available on the first disk. In the worst case that 36 of the 37 slots served by a partition are being used, the user may have to wait almost fifteen disk switch times to begin viewing. It can be shown that the worst case wait time in this scenario is on the order of 1.25 seconds. That is, the maximum time delay from the time that the EXECUBE switch is commanded to deliver a specific movie until that movie is available at the desired line is on the order of 1.25 seconds.

The partitioning technique also enables highly responsive virtual VCR functions. The worst case movie start-up delay is also the worst case pause/resume response time. When a pause command (for a specific viewer) is sent to the switch for the workstation, the switch stops sending data to that viewer. This occurs nearly instantaneously. When the resume command is sent to the switch, the worst case delay until data transmission resumes is equal to the time it takes for the viewer's slot in the rotation to return to the disk from which the viewer's last 32 KB block was read. Again, this is on the order of 1.25 seconds, maximum.

Fast forward (FFWD) is accomplished as follows. As a viewer's data source is switched from one disk to the next, the normal mode of operation is that the next time slice of the movie (32 KB worth) is read from the disk. A 32 KB block corresponds to 80 milliseconds (ms) of viewing time. Thus, the blocks of one disk are time slices sampled 1.2 seconds apart (in terms of viewing time). In FFWD mode, instead of accessing the next block in the sequence, we skip ahead one block on the disk; i.e., we move forward 1.2 seconds. Thus, the fast forward time step is 1.2 seconds. It is a task of the set top box to find the start of an I frame in the MPEG data stream such that full frames are decoded during fast forward.

For virtual rewind (REW), a similar approach is used. As we access the previous in the rotation, we access a block 1.2 seconds earlier in the movie. Alternatively, the user may select an amount of time to rewind (e.g., 10 seconds, 30 seconds, etc.) via the set top remote control. This time is transmitted to the workstation, which in turn commands the switch to restart the movie from a particular block number.

The disk striping technique described has the feature that all viewers assigned to a partition may be watching the same movie at any point within the movie, or they may be watching any of the thirty seven unique titles available on the partition. Typically, the most popular movies of the day are available on every partition. For example, if the top seventeen movies are replicated on each partition, then any viewer can watch any of these movies independent of what other viewers are watching. Movies are stored on the remaining fifteen storage spaces per partition based on an off-line caching algorithm. For example, the next ten most popular movies could be replicated on three quarters of the partitions, thereby making them available to three quarters of the viewers. The caching algorithm allows some movies to be available only on one partition. This means that after thirty-seven viewers are assigned to a partition, any movie unique to that partition is no longer available, even if none of the thirty-seven viewers on the partition are watching it.

In order to keep the widest selection of movies available to viewers as the number of viewers increases, it is necessary to assign the viewers to partitions in a manner that matches the day's caching scheme. For example, if a viewer requests a top fifteen movie, that viewer is assigned to the partition with the fewest active viewers. As the available viewing slots fill up, viewers are assigned to partitions in a way in which all titles remain available as long as possible. This is a relatively straight forward assignment problem which is handled by the workstation. Using this caching and assignment technique, at least 500 unique titles will be available for viewing each night. Most titles will be available at any time, until the number of viewers exceeds 90% of the system capacity.

Assuming a 32 KB block size and 1 MB/sec disk I/O, the switch rotation must be reset every 32 ms. With this striping scheme, there are thirty-seven viewer slots available on each partition. Once assigned to a slot, a viewer remains in that slot until the movie is finished. Unfortunately, this does not mean that the switch settings to route the data from a partition to a line remain fixed for the duration of the viewing..As new viewers are assigned to partitions, previously established routing patterns will have to change to free up paths needed by new viewers. Thus, routing patterns remain constant (i.e., they repeat with the rotations among the disks) until such time as a new viewer is added to the server. This is a type of "rearrangement" associated with the rearrangeably non-blocking character of the Benes network.

Given the nature of the video switch routing requirements, the switch control is partitioned between the workstation and the switch itself. Each EXECUBE 2×2 switch element contains four fully programmable 16-bit processors, each with 64 KB of RAM. Each EXECUBE processor computes its own local switch setting every 32 ms based on a local program and routing table. As new viewers are added to the system, the workstation broadcasts a new routing table to all EXECUBE processors. Variations on this control scheme are described above. As described above, this will occur very infrequently and will not interfere with the real-time operation of the switch. This partitioning of the routing task allows the power of the workstation to be applied for the computationally demanding routing table calculation, while the repetitive, real-time switch control task is assigned to the EXECUBE processors.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A video on demand server supplying digitized movies to subscribers via a distribution network comprising:

a disk array storing a plurality of digitized movies, said movies being stored across a plurality of disks in a data striping pattern in a plurality of partitions;

a multiprocessor switch array composed of a plurality of processing elements, each processing element including a central processing unit and a local memory, said local memory storing switching information for supplying requested movies to requesting subscribers; and a workstation connected to said multiprocessor switch array and responsive to requesting subscribers for assigning subscribers to one of said plurality of partitions of said disk array and controlling individual switches in the multiprocessor switch array so that requested movies are transmitted to requesting subscribers on demand.

2. The video on demand server recited in claim 1 wherein said multiprocessor switch array is a Benes network composed of 2×2 switch elements in a minimal switch topology.

3. The video on demand server recited in claim 2 wherein said 2×2 switch elements are implemented in pairs as simple binary hypercubes where a processing element forms each of eight "corners" of a hypercube, forming two 2×2 switch elements.

4. The video on demand server recited in claim 3 wherein each binary hypercube is formed on a single integrated circuit chip.

5. The video on demand server recited in claim 3 wherein each partition in the data striping pattern of the disk array stores a predetermined number of complete movies, allocated across the partition in data blocks.

6. The video on demand server recited in claim 5 wherein, to serve a movie to a requesting subscriber, the multiprocessor switch array sequentially reads one block from each disk in a partition in a rotation among disks in the partition for a duration of the movie.

7. The video on demand server recited in claim 6 wherein said workstation is responsive to subscriber commands to provide virtual video cassette recorder functions, including play, pause, fast forward, and rewind.

8. A video on demand distribution system comprising:

a video on demand server including a disk array storing a plurality of digitized movies, said movies being stored across a plurality of disks in a data striping pattern in a plurality of partitions, a multiprocessor switch array in the form of a Benes network composed of 2×2 switch elements in a minimal switch topology and composed of a plurality of processing elements, each processing element including a central processing unit and a local memory, said local memory storing switching information for supplying requested movies to requesting subscribers, and a workstation connected to said multiprocessor switch array and responsive to requesting subscribers for assigning subscribers to one of said plurality of partitions of said disk array and controlling individual switches in the multiprocessor switch array so that requested movies are transmitted to requesting subscribers on demand;

a distribution system connecting to said multiprocessor switch array with a plurality of subscriber terminals; and a plurality of decoders connected to said plurality of subscriber terminals for decoding digitized movies for reproducing on a television set or monitor.

9. The video on demand distribution system recited in claim 8 wherein said 2×2 switch elements are implemented in pairs as simple binary hypercubes where a processing element forms each of eight "corners" of a hypercube, forming two 2×2 switch elements, and wherein each binary hypercube is formed on a single integrated circuit chip.

10. The video on demand distribution system recited in claim 9 wherein, to serve a movie to a requesting subscriber, the multiprocessor switch array sequentially reads one block from each disk in a partition in a rotation among disks in the partition for a duration of the movie, and wherein said workstation is responsive to subscriber commands to provide virtual video cassette recorder functions, including play, pause, fast forward, and rewind.

\* \* \* \* \*